United States Patent [19]
Koksbang

[11] Patent Number: 5,387,479
[45] Date of Patent: Feb. 7, 1995

[54] ELECTRODES FOR RECHARGEABLE LITHIUM BATTERIES

[75] Inventor: Rene Koksbang, San Jose, Calif.

[73] Assignee: Valence Technology, Inc., San Jose, Calif.

[21] Appl. No.: 78,664

[22] Filed: Jun. 16, 1993

[51] Int. Cl.$^6$ ............................................. H01M 4/62
[52] U.S. Cl. ................................... 429/126; 429/212; 429/217; 427/122; 427/388.2
[58] Field of Search ............... 429/126, 137, 212, 217, 429/246; 29/623.5; 427/122, 388.2

[56] References Cited

U.S. PATENT DOCUMENTS

| | | | |
|---|---|---|---|
| 3,723,610 | 3/1973 | Fischer et al. | 423/447 |
| 3,832,269 | 8/1974 | Butler | 161/162 |
| 3,993,501 | 11/1976 | Kalnoki-Kis | 429/212 X |
| 4,175,055 | 11/1979 | Goller et al. | 252/425.3 |
| 4,517,265 | 5/1985 | Bélanger et al. | 429/217 |
| 4,830,939 | 5/1989 | Lee et al. | 429/192 |
| 4,959,281 | 9/1990 | Nishi et al. | 429/194 |
| 5,068,126 | 11/1991 | Suzuki et al. | 427/122 |
| 5,128,220 | 7/1992 | O'Hara et al. | 429/137 |
| 5,176,969 | 1/1993 | Miyabayashi et al. | 429/212 |
| 5,262,255 | 11/1993 | Ito et al. | 429/217 |

Primary Examiner—Stephen Kalafut
Attorney, Agent, or Firm—Linda M. Deschere

[57] ABSTRACT

In an electrochemical cell having an active metal negative electrode, a positive electrode and a electrolyte separator there is provided a first layer between the negative electrode and the electrolyte separator, the layer comprises a carbon-based material which is a conductor of electrons and a conductor of metal ions of the negative electrode. The layer restricts penetration of electrolytic organic and anionic salt constituents therethrough and prevents degradation of the negative electrode.

21 Claims, 1 Drawing Sheet

ELECTRODES FOR RECHARGEABLE LITHIUM BATTERIES

FIELD OF THE INVENTION

This invention relates to electrochemical batteries, and more particularly, to improved electrode assemblies for such batteries.

BACKGROUND OF THE INVENTION

Batteries, with metallic electrodes, have a limited life-cycle due to the degradation of the metallic electrodes. For example, lithium, when used as the anode (negative electrode), is attacked and/or passivated by electrolytes. This results in formation of lithium powder with a very high surface area at the interface between the metallic lithium and the electrolyte. The formation of high surface area lithium powder is undesirable because it reacts violently with moisture and air.

Composite anode alternatives have been suggested to overcome such problems, but they are prone to a large loss of capacity as compared to metallic lithium. Lithium alloy active materials have a relatively short cycle life due to mechanical degradation of the electrode.

Therefore, what is needed is a cell construction and method of operation which overcomes problems with passivation in order to prevent degradation of cell performance.

SUMMARY OF THE INVENTION

According to the invention, there is provided an electrochemical cell which has a negative electrode which comprises a solid body having an active material of lithium metal or a lithium-containing material. A major surface of the body faces an electrolyte or an electrolyte separator. A layer is disposed between the major surface of the negative electrode and the electrolyte. Preferably, the layer is a coating carried on the major surface of the negative electrode. The coating comprises carbon or lithiated carbon which is a conductor of electrons and a conductor of the metal ions of the negative electrode. The coating is of a thickness sufficient to restrict penetration of electrolyte therethrough, while at the same time, conduct electrons and positive lithium ions. Carbon materials which satisfy the requirement of ionic and electronic conductivity are carbon, graphite or lamp black carbon in micron size particle form. Carbon and lithium react spontaneously to form $Li_xC_6$ ($0 < X \leq 1$), so that lithium ions and electrons are transported through the carbon layer.

Preferably, such carbon is in the form of a carbon foil comprising carbon particles in a binder matrix thus constituting the interface layer between the negative electrode and the electrolyte. Although any suitable matrix for retention of carbon may be used, such matrix material must be constructed and arranged to prevent migration of electrolyte salt and organic components to the lithium negative electrode. Such matrix material is preferably a good conductor of positive ions so as to enhance transport of $Li^+$ ions.

An electrochemical cell, prepared in accordance with the invention, has an anode, a cathode, and an electrolyte separator comprising a polymeric network containing an electrolyte solution comprising a metal salt of the anode. The electrolyte separator is disposed between the anode and the cathode. The negative electrode (anode) has the carbon-based material applied thereto, as described above.

Accordingly, it is an object of the present invention to provide an improved electrochemical battery based on lithium which maintains its integrity over a prolonged life-cycle as compared to presently used batteries. Another object is to provide a conductive coating for an anode active material which prevents passivation at the surface of the anode adjacent the electrolyte.

These and other objects, features and advantages will become apparent from the following description of the preferred embodiments, appended claims and accompanying drawings.

DETAILED DESCRIPTION OF THE PREFERRED EMBODIMENTS

Figure 1:
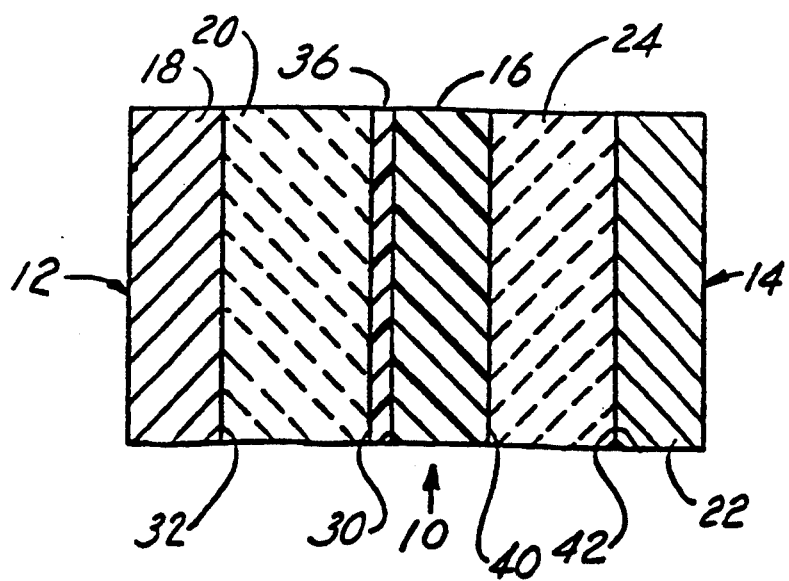
FIG. 1 is an illustration of a cross-section of a lithium battery or cell having a carbon-based layer between a negative electrode and an electrolyte separator.

An electrochemical cell or battery 10 has a negative electrode side 12, a positive electrode side 14, and an electrolyte separator 16 therebetween (FIG. 1). In accordance with common usage, a battery may consist of one cell or multiple cells. The negative electrode side 12 is the anode during discharge, and the positive electrode side 14 is the cathode during discharge. The negative electrode side 12 includes current collector 18, typically of nickel, iron, aluminum, stainless steel, and/or copper foil, and a body of negative electrode active material 20. The negative electrode active material 20 consists of lithium, or compounds and alloys thereof, and is sometimes simply referred to as the negative electrode. The body of the negative electrode 20 has first and second opposed major surfaces 30, 32. The first surface 30 faces electrolyte separator 16 and the second surface 32 faces current collector 18.

The positive electrode side 14 includes current collector 22, typically of aluminum, nickel, iron, stainless steel, and/or copper, and a body of positive electrode active material 24. The positive electrode active material 24 is sometimes simply referred to as the positive electrode. Typical positive electrode active materials include transition metal chalcogen compounds having a reversible lithium insertion ability, wherein the transition metal is at least one selected from the group consisting of Ti, V, Cr, Mn, Fe, Nb, Mo, Ta and W, and the chalcogen is at least one selected from the group consisting of O, S and Se. The body of the positive electrode 24 has first and second opposed major surfaces 40, 42. The first surface 40 faces the electrolyte separator 16 and the second surface 42 faces current collector 22.

The separator 16 is typically a solid electrolyte, electrolyte separator. A suitable electrolyte separator is described in U.S. Pat. No. 4,830,939, and is a solid organic polymer matrix containing an ionically conductive liquid with an alkali metal salt where the liquid is an aprotic polar solvent. The terms "solid electrolyte" and "electrolyte separator" are used interchangeably in industry. Sometimes the term "separator" alone is used. U.S. Pat. No. 4,830,939 is incorporated herein by reference in its entirety.

The rechargeability of lithium batteries is limited by the cyclability of a lithium metal anode which converts to high surface area powder during cycling. This is called "passivation" and it occurs at the surface 30 facing the electrolyte separator 16. Electronic contact to the powder is lost and the capacity of the battery decreases. Furthermore, the lithium powder is highly reactive and may ignite if the battery is heated as by short circuit, other high current drain or external heat source, or if punctured causing reaction between lithium and the ambient atmosphere.

According to one aspect of the invention, to prevent passivation a conductive coating of carbon-based material 36 is disposed between the first surface 30 of negative electrode body 20 and electrolyte separator 16. Preferably, the coating 36 is carried on the first surface 30 of the negative electrode body 20. Such coating 36 prevents passivation and avoids safety and cyclability problems associated with lithium electrodes by preventing contact between the electrolyte and the metallic lithium. This prevents degradation caused by reaction between these two components of the cell. The coating is electrochemically stable with respect to the electrolyte and the active material of the electrode. Both surfaces 30,32 of negative electrode 22 may be coated; however, there does not appear to be an advantage to placing such coating of carbon on the current collector side 32 of the negative electrode body 20.

The coating 36 which separates the lithium and the electrolyte is electrochemically stable, lithium ion conductive, and electrically conductive. Such coating 36 is formed of a carbon-based (organic) material such as carbon, graphite, or lamp black carbon. The material may form a single layer or multiple layers on the surface of the metallic anode. It may include carbon in the form of particles. Such carbon particles are preferably of micron or submicron size. Preferably, such carbon-containing (carbonaceous) material is in the form of a carbon foil. By placing a carbonaceous layer in contact with metallic lithium, the carbon and some of the lithium from the anode react spontaneously to form $LiC_6$, which constitutes at least a portion of the interface layer or coating 36.

Carbon coated plastic sheets or carbon retained in organic polymers (plastic) are able to be shaped into a suitable form to provide a layer which is then applied to a metallic lithium sheet. Alternatively, a carbon containing mixture may be formed and applied as a coating directly onto the lithium metal sheet. Such layers and coatings are formed by application of an organic mixture (carbon plus binder) onto a surface, and followed by mechanical pressing or heating or radiant curing.

Apart from the electrical requirements, the only other requirement is that the layer be at least a monolayer of molecules to reduce penetration of electrolyte components through the layer. It is preferably dense and essentially impermeable to the electrolytic organic and anionic salt constituents thereby preventing reaction between such electrolytic constituents and lithium negative electrode active material. The coating desirably has a thickness of 0.1 millimeters or more. The coating 36, comprising one or more carbon-based materials, is permeable to lithium, having interstitial sites for inclusion of lithium, but insufficient for penetration by larger diameter anionic species of the electrolyte. The average radius of atomic lithium in the crystal structure of a metal is about 1.55 angstroms. The interstitial sites of the layer should have at least one dimension greater than 1.55 angstroms to accommodate lithium. Such sites should have at least one dimension less than about 4 angstroms as anionic and organic species of the electrolyte are expected to be larger than about 4 angstroms.

Compared to pure lithium metal anodes, which require an excess capacity compared to the cathode to provide a reasonable cycle-life (typically 5-10 times excess), anodes of the invention only require an amount of lithium corresponding to the capacity of the cathode plus the amount needed to form $LiC_6$, which will obviously depend on coating 36 thickness and inherent capacity.

As used herein, a carbon layer comprises carbon coating, carbon sheet, carbon foil and carbon paper, and such sheets, foils and papers impregnated with a binder and/or a polymeric binder/electrolyte, or both.

As stated, the protective conductive coating on the electrode is preferably in the form of a sheet or foil, that is, a conducting foil of carbon. Such sheets or foils may be a composite foil of a binder and a conducting phase comprising carbon. In either event, the conducting carbon has a conductivity of $10^{-4}$ Siemens/cm (S/cm) and desirably $10^{-3}$ S/cm or higher. It is preferred that the conductivity of the carbon not limit the rate capabilities of the battery system. That is, the conductivity should probably not be much lower than the conductivity of the composite electrodes and electrolytes, that is, greater than 0.001 and preferably in the range of 0.001-0.01 S/cm.

The invention will now be further illustrated by describing basic methods for forming the protective layer between the anode active material 20 and the electrolyte 16. Then, the assembly of a test cell with anode active material 20, protective layer 36, separator/electrolyte 16, and cathode 14 will be described.

The material constituting the protective layer 36 was prepared in the following manner. First carbon particles of furnace black or acetylene black were obtained. Such carbon is available from various chemical companies: examples are Union Carbide, Conoco and Noury Chemical Corp. One particularly suitable carbon is known as Shawinigan carbon black. The material may be a powder or in lumps. Irrespective of the form of the original material, the carbon is milled. This is done in order to reduce particle size. In an as-received condition, a typical carbon powder has particles of a size less than 100 microns, usually less than 10 microns, and often of micron or submicron size. Shawinigan carbon black has particle size on the order of less than one micron and is easily ball-milled to a size of about 0.02 microns. Thus, the carbon particles are very fine, or may be milled to very, very fine size. Milling reduces carbon particle size to less than one micron, desirably less than 0.1 micron, and preferably to less than 0.01 micron. Methods for ball-milling carbon are described in U.S. Pat. No. 4,175,055.

By way of example, protective coatings having a relatively high amount of binder (40%) may be prepared from a mixture having the consistency of a paste, and comprising about 150 grams of the carbon particles, and about 197 grams of polymeric acrylate (binder/electrolyte). The polymeric acrylate is a polyethylenically unsaturated compound including at least one heteroatom as described in U.S. Pat. No. 4,830,939 (previously incorporated herein by reference in its entirety). The paste is applied as a layer on a lithium foil anode. The polymeric acrylate is polymerized and cross-linked by electron beam radiation cross-linking (generally referred to as EB curing).

The amount of binder is not critical but it must be sufficient to form a matrix for holding the particles of carbon in position. Preferably the binder is an electrolyte for enhancement of lithium transfer across the carbon containing layer. The amount of binder may be up to about 40%, 40 parts binder and 60 parts carbon. More typically, the carbon content is higher and the binder falls in the range of 0.5 to 20 parts, desirably 0.5 to 15 parts and preferably 5 to 15 parts based on 100 parts of the combined weight of the carbon and polymer binder in the layer.

It should be noted that carbon powders are available from a variety of suppliers and have generally similar characteristics, with some minor variations. Although Shawinigan is expected to give good results, other powders, commonly available, have the following characteristics. Properties of carbon include BET area, relative pH in water, and pore size. Carbon particles define pores, some of which are internal pores in the form of holes in the carbon particles; other pores are external between adjacent carbon particles. Internal pores are also referred to as micropores which generally have an equivalent radius (size) less than about 2 to 3 nanometers (nm) or 20 to 30 angstroms. External pores are also referred to as mesopores which generally have an equivalent radius (size) of over about 3 nanometers and up to about 20 nanometers or 200 angstroms. The total surface area present in a mass of carbon particles is referred to as BET surface area, expressed in meter squared per gram ($m^2/gm$). (BET surface area accounts for both mesopores and micropores present in the mass.) As used herein, the terms "pore" and "pores" refer to both mesopores and micropores and also refer to both internal and external pores unless otherwise indicated. One carbon powder (carbon particles) commercially available under the designation AX-21 carbon is a high surface area carbon (2900 square meters per gram) with predominately micropores (80%). Another group of carbon particles, Ketjan Black, has a BET surface area of 900 and a high percentage of mesopores (88%). Ketjan Black has an average particle size, or equivalent average diameter, of about 10 to 100 nanometers (0.01 to 0.1 microns), and typically on the order of 30 nanometers. Noury Chemical Corp. sells such carbon particles under the stated designation Ketjan Black. Carbon powders sold under the designation Raven 5000 and Vulcan have a fair share of both micro and mesopores. The BET surface areas of Vulcan Acetylene Black (AB) and Raven 5000 are as follows: 230, 64, 481. Ketjan Black has only one third of the BET area of AX-21, but the mesopore area is several times higher as compared to micropore area. Another property of carbon particles which may affect its performance in the protective layer is the pH of an aqueous slurry of such particles. Some carbon particles exhibit a relatively acidic pH in water whereas others are relatively basic. It appears that the origin of the pH effect lies in the nature of the surface functional groups which consequently determine the pH of the aqueous slurry. Carbon particles exhibiting a relatively acidic pH seem to be due to the presence of carboxylic (—COOH) groups on the carbon surface. On the other hand, carbon particles such as Ketjan Black have relatively oxygen free surfaces in the nature of a relatively bare carbon surface. The aqueous equilibrium for such is set up in the alkaline pH range of a pH of about 7 to about 9. Although all of the carbon particles described above are expected to form suitable barrier layers to protect the lithium metal electrode, the ultimate selection of the type of carbon particle powder will depend on desired optimization of the cell in which it is used.

Carbon particles for use in the invention are produced by a variety of methods, many of which center upon thermal decomposition of hydro-carbon feed at a decomposition temperature in the range of about 450 to 1,300 degrees centigrade. The dimensions of the graphite and/or carbon particles so formed depend upon parameters such as the hydrocarbon selected, the decomposition temperature and the rate of throughput of the hydrocarbon feed in the reaction process. Longer residence times generally result in formation of larger particles and/or fibers. Although it is theoretically possible to form carbon or graphite particles and/or fibers and then deposit them directly onto the metallic lithium, the particles would generally be at too high a temperature for direct deposition as the melting point of lithium is approximately 186° C. Therefore, it would be necessary to first cool the particles and/or fibers before depositing onto the lithium sheet. For this reason, it is preferred that carbon particles formed by thermal decomposition be rendered to a suitable particle size and then mixed with a binder and the resultant mixture turned into a paste for application to the metallic lithium sheet. U.S. Pat. No. 4,959,281 describes production of carbonaceous material by carbonizing or decomposing in a nitrogen stream a polymer at a temperature of about 500° C. to about 1100° C. and then grinding the resultant carbon to a particle size of not more than 390 mesh and preparing a mixture based on 100 parts by weight of 90 parts carbon and 10 parts binder. U.S. Pat. No. 4,959,281 is incorporated herein by reference in its entirety. The method of the 281 patent provides carbonaceous material having interlayer spacing of a few angstroms sufficient to permit migration of lithium ions therethrough but sufficiently small enough to deter migration of electrolytic organic and salt components detrimental to metallic lithium.

Commercially available carbon papers or foils may be prepared by impregnation with a proton conductive polymer in a solution. Carbon paper may, for example, be produced by carbonizing fibers such as nylon or rayon by heating them at high temperatures in the range 1300° F.–1500° F. and forming them into a thin paper by any well known paper process. Carbon paper is commercially available from a number of sources. One acceptable carbon paper is that sold by the Stackpole Corp. of St. Marys, Pa., under its trade designation PC-206. The impregnated graphite or carbon paper may be densified by mechanical or hot pressing to reduce the occurrence of void spaces. Such densified sheets reduce or prevent penetration of electrolytic constituents through such sheets to avoid reaction between such constituents and the metallic lithium active material.

Examples of other carbon-containing layers and methods of forming such layers are described below. In one desired form, the carbon-containing coating or layer contains a mixture of fine particles of carbon and a binder. The binder may be a thermoplastic resin, with carbon black intermingled with the resin so as to constitute a sheet or foil. U.S. Pat. No. 3,832,269 describes a method for forming carbon foil (sheet-like articles) containing a polymer and carbon black. The constituents are blended together to provide a homogeneous mixture which is then formed and cured. The foils are formed on a substrate or applied thereto after formation by mechanical and/or hot pressing. The binder preferably has ionic transport properties to aid in transport of $Li^+$ ions across the layer. Such binder/electrolyte carbon composite may be formed by radiation curing of one or more precursor polymers. (As described earlier with reference to U.S. Pat. No. 4,830,939). In another variation, the carbon-containing layer is formed from condensation polymerization of a polymer precursor and then pyrolysis to form a carbon foil. (U.S. Pat. No. 3,723,610) In still another alternative, the coating consists essentially of carbon graphite deposited in successive layers to minimize void spaces and to minimize through openings in the coating. (U.S. Pat. No. 5,068,126).

As stated earlier, it is preferable to use carbon in the form of a powder, which is then combined with a polymeric binder and molded and cured in the shape of a sheet. The molding of the carbon layer may be by using an organic polymer dissolved and/or dispersed in a solvent where the organic polymer becomes the binder. For the use of the aforementioned organic polymer as a binder, there may be employed a method which comprises preparing a liquid binder by dissolving the organic polymer in a solvent and dispersing the carbon in the liquid binder and applying the resultant dispersion or paste on the lithium metal substrate. Alternatively, there is a method which comprises emulsifying the organic polymer in water, dispersing the carbon in the emulsion and applying the resultant dispersion on a substrate; a method which comprises pre-molding the carbon and applying a solution and/or dispersion of the organic polymer on the pre-molded carbon layer; or a method which comprises mixing the carbon with a powdery binder and compression molding the resultant mixture. The layer may be produced by applying the aforementioned mixtures on a substrate other than the lithium metal sheet and drawing, curing or forming the applied coating in the form of a layer which is then removed from the substrate and applied by mechanical, hot-pressing, or other means to the metallic lithium anode. In accordance with the examples given herein above, the following U.S. Patents are incorporated herein by reference in their entirety: 3,832,269, 4,830,939, 4,959,281, 3,723,610, 4,175,055, and 5,068,126.

While not wishing to be held to any particular theory, it is thought that the following applies. The carbon layer forms a barrier between the electrolyte and the metallic lithium to prevent movement of electrolytic organic and anionic salt constituents toward the metallic anode. The polymer binder adds structure to the barrier, retains the carbon in place and helps prevent movement of such electrolytic constituents toward the anode. The binder should be proton conductive to enhance movement of lithium between the anode and cathode. Proton conductive polymers typically have a sulfuric (SO—$_3$) group which forms the ion exchange component of the polymer/binder (SO$_3$Li$^+$), where Li$^+$ is the mobile ion component. As stated earlier, the carbon component of the layer becomes lithiated and carbon is a conductor of electrons, thus the carbon facilitates movement of lithium as well as electrons through the layer. Although it is possible to deter penetration of certain undesired electrolytic species by use of a densified carbon barrier (i.e. carbon black or graphitic carbon) it is preferred to include an electrolytic (proton conductive) binder. Such electrolytic binders which are proton conductive should not be confused with the organic species and the anionic metal salt species of the solid electrolyte.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:
1. A battery comprising:
   a) an electrolyte;
   b) a negative electrode having an active material consisting essentially of lithium or alloys thereof and being in the form of a solid body having a major surface facing the electrolyte; and
   c) a layer between the major surface of the electrode and the electrolyte for reducing passivation of the electrode body, said layer comprising particles of carbon retained in a binder matrix material.
2. The battery according to claim 1, wherein the particles of carbon are of micron or submicron size.
3. The battery according to claim 1, wherein the layer comprises submicron size void spaces sufficient for inclusion of (Li$^+$) ions.
4. The battery according to claim 3, wherein the carbon and the included lithium are in an atomic ratio of up to about one mole lithium for every six moles of carbon.
5. The battery according to claim 1, wherein the particles of carbon have pores of a size sufficient for intercalation of lithium (Li$^+$) ions.
6. The battery according to claim 1, wherein the layer is a coating carried on the major surface of the electrode.
7. The battery according to claim 1, wherein the binder is a polymeric conductor of metal ions of the negative electrode.
8. The battery according to claim 1, wherein the layer at least restricts penetration of the electrolyte.
9. A battery comprising:
   a) an electrolyte;
   b) a negative electrode having an active material consisting essentially of lithium or alloys thereof and being in the form of a solid body having a major surface facing the electrolyte; and
   c) a layer between the major surface of the electrode and the electrolyte for reducing passivation of the electrode body, said layer being electronically conductive and ionically conductive of metal ions of the negative electrode.
10. The battery according to claim 9, wherein the layer is a coating carried on the major surface of the electrode.
11. The battery according to claim 9, wherein the layer consists essentially of carbon graphite deposited on the electrode in successive sublayers having interlayers of spacing sufficient for intercalation of lithium (Li$^+$) ions.
12. In a battery having a lithium-containing negative electrode body, a positive electrode body, an electrolyte separator in the form of a polymeric network containing an electrolyte solution comprising a metal salt of the negative electrode disposed between the negative and positive electrode bodies, the improvement comprising a layer between the negative electrode body and the polymeric network, said layer comprising carbon-based material being electronically conductive and conductive of metal ions of the negative electrode and capable of restricting penetration of electrolyte therethrough.

13. The battery according to claim 12, wherein the carbon-based material consists essentially of carbon or lithiated carbon.

14. The battery according to claim 12, wherein the carbon-based material comprises a matrix material and particles of carbon or lithiated carbon retained by the matrix material.

15. A method of making an electrode structure for a lithium battery having metallic lithium or lithium alloy active material comprising:
   a) forming a mixture of polymeric binder material and carbon particles; and
   b) applying the mixture onto a major surface of the metallic lithium body and curing the applied mixture for a time sufficient to form an adhered coating of said mixture on the body with said carbon particles retained by the matrix.

16. The method according to claim 15, wherein the curing is by electron beam radiation sufficient to provide cross-linking of the polymeric binder material.

17. The battery according to claim 1 wherein the layer prevents penetration of the electrolyte.

18. The battery according to claim 1 wherein the carbon is graphitic carbon.

19. The battery according to claim 12 wherein the layer comprises graphitic carbon.

20. The battery according to claim 9 wherein the layer consists essentially of graphitic carbon and lithiated graphitic carbon.

21. The battery according to claim 9 wherein the carbon based material comprises a polymeric matrix material which is a conductor of metal ions of the negative electrode.

* * * * *